FILTER CLEANING OF TRAVELING OVERHEAD CLEANERS
Filed Aug. 25, 1965
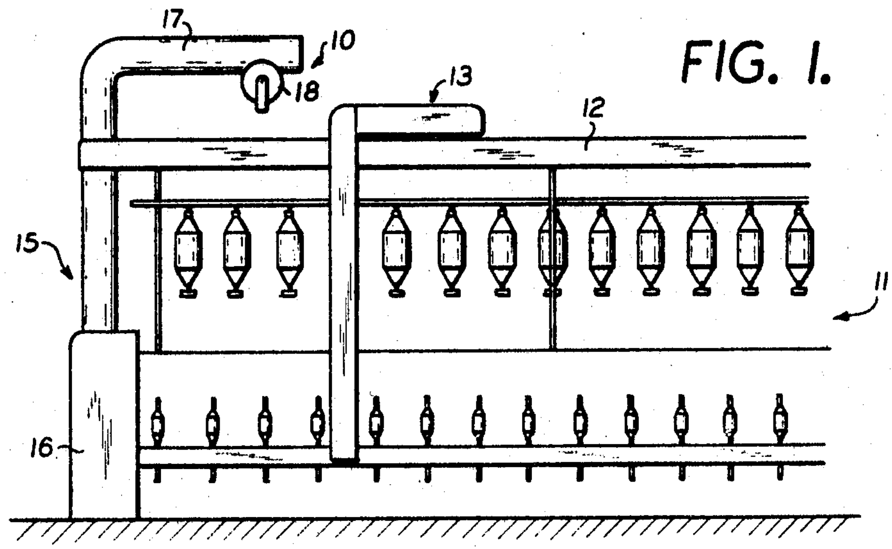
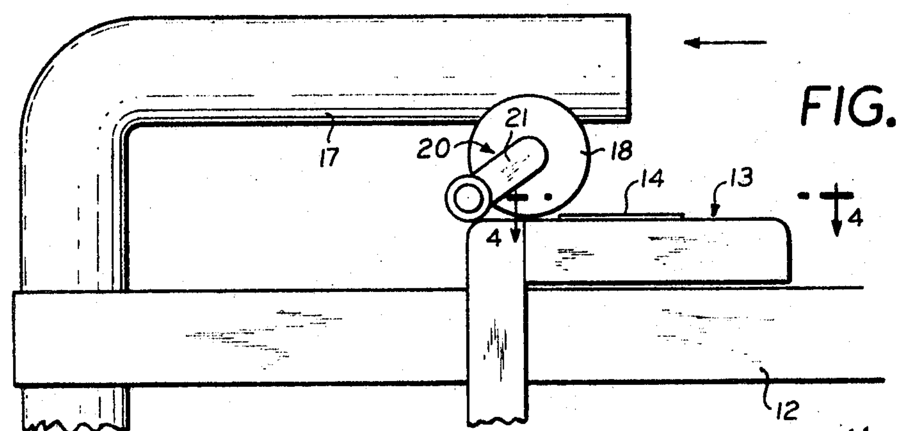
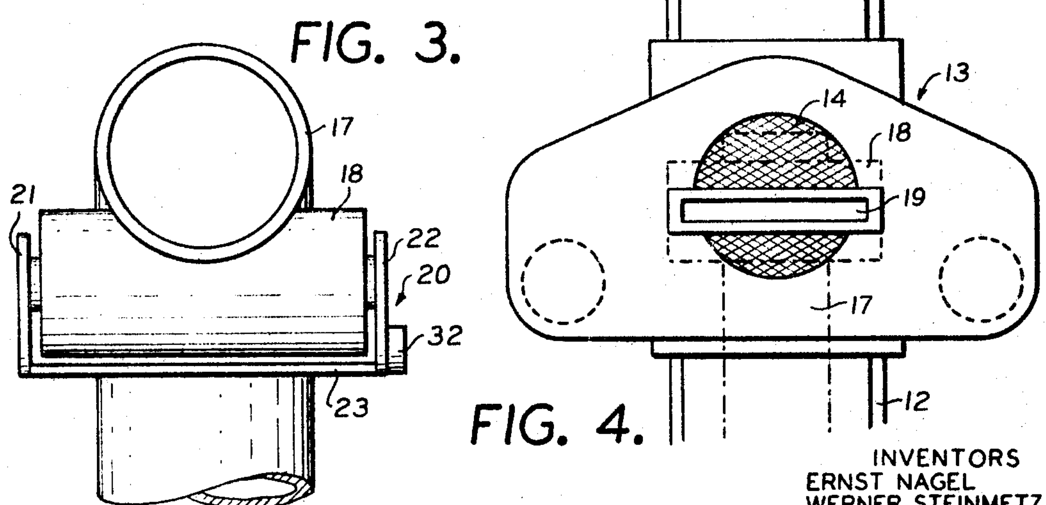
INVENTORS
ERNST NAGEL
WERNER STEINMETZ
BY Hopgood, Calimafde, Kalil & Blaustein
ATTORNEYS.

United States Patent Office 3,464,078

Patented Sept. 2, 1969

3,464,078

FILTER CLEANING OF TRAVELING OVERHEAD CLEANERS

Ernst Nagel, Weisslingen, Zurich, and Werner Steinmetz, Wetzikon, Zurich, Switzerland, assignors, by mesne assignments, to Luwa Ltd., Zurich Switzerland, a corporation of Switzerland Filed Aug. 25, 1965, Ser. No. 482,362
Claims priority, application Switzerland, Aug. 26, 1964, 11,166/64
Int. Cl. A47l 5/00; B01d 33/00
U.S. Cl. 15—312 3 Claims

ABSTRACT OF THE DISCLOSURE

Suction cleaning equipment for cleaning the filter screen of traveling overhead cleaners in which ambient air is passed through the screen and directed over the production apparatus in a textile mill to clean same. The improved filter cleaning equipment employs a cylindrical suction head with its axis perpendicular to the path of travel of the traveling cleaner, with an intake orifice in the cylindrical suction head extending over the width of the filter screen of the traveling cleaner. A yoke shaped closure valve is mounted to pivot about the axis of the cylindrical suction head to keep the intake orifice closed until the traveling cleaner moves adjacent the suction head, with the weight of the valve serving to close off the suction head intake orifice to minimize air handling requirements, and simplify the cleaning mechanism.

Background of the invention

This invention relates to the art of overhead cleaners of the type used in textile mill installations, more particularly to means for cleaning the filters conventionally employed on traveling overhead cleaners so as to insure the free flow of air therethrough, and to provide a relative pure cleaning air stream.

A variety of traveling overhead cleaners have been evolved for use in textile mills to implement cleaning of mill equipment of accumulations of lint, fly, or the like foreign matter which tends to accumulate on the processing equipment in a textile mill, which unless removed interferes with efficiency of operation and quality of product. These traveling overhead cleaners generally comprise a blower unit mounted on an overhead rail positioned over the equipment to be cleared. The discharge of the fan is downwardly directed to blow accumulated matter from the equipment. In order to provide a cleaning air stream relatively free of impurities, a filter screen is mounted over the intake of the blower fan to filter foreign matter from the cleaning airstream. Due to the air currents set up by the blower fan, many of the impurities blown by the cleaning airstream from the textile equipment over which the blower is mounted tend to be picked up in the cleaning airstream and collect on the filter screen. With time the filter screen becomes clogged thus preventing the desired flow of air and interfering with cleaning action by the overhead cleaner. It thus becomes necessary to periodically stop the operation of the overhead cleaner to clean the air filter. Aside from the costs incurred in this cleaning, the cleaning of the filter screen within the mill area presents additional problems in that the foreign matter removed from the filter screen is then subject to being redistributed in the mill area by stray air currents.

Summary

It is with the above problems and desiderata in mind that the present means, including both method and apparatus have been evolved, means providing for periodic automatic cleaning of filter screens of traveling overhead cleaners serving to insure the presence of a clean filter screen and the flow of relatively clean cleaner air, with the foreign matter removed from the filter screen prevented from inadvertent recirculation in the mill area.

It is accordingly among the primary objects of this invention to provide means serving to improve the operation of overhead cleaners by maintaining the filter screens employed on such overhead cleaners in a relatively clean condition.

Another object of the invention is to provide means for maintaining the filter screens of traveling overhead cleaners in textile mills in a clean condition, with the material removed from the filter screen prevented from being recirculated in the mill area.

It is also an object of the invention to provide an improved filter cleaning apparatus for cleaning the filters of overhead cleaners without requiring the services of maintenance operators.

These and other objects of the invention which will become hereafter apparent are achieved by establishing an airstream adjacent the path of travel of the overhead cleaner. This airstream is preferably established by use of a suction duct having a stationary suction head positioned adjacent one end of the path of travel of the overhead cleaner. The filter of the overhead cleaner is periodically exposed to the airstream so that foreign matter accumulating on the filter screen is entrained in the airstream. This is best accomplished by arranging a valve element over the stationary suction head, which valve element is moved by the traverse of the overhead cleaner so as to expose a suction orifice to the filter of the overhead cleaner.

A feature of the invention resides in the fact that the suction duct is directed to a collection point remote from the mill atmosphere so that any foreign matter from the filter screen may be readily removed without being entrained in the air currents of the textile mill.

A further feature of the invention resides in the fact that the filter screen is automatically exposed to the suction airstream without the intermediary of any human operators, thus minimizing cleaning costs.

Brief description of the drawing

The specific details of a preferred embodiment of the invention, and their mode of functioning, will be made most manifest and particularly pointed out in clear, concise and exact terms in conjunction with the accompanying drawings, wherein:

FIG. 1 is a schematic elevational view of a spinning frame shown provided with an overhead cleaner and means for cleaning the filter screen of the overhead cleaner in accordance with the teachings of this invention;

FIG. 2 is an enlarged schematic elevational view showing the suction head of the filter cleaning means as it is operated to effect cleaning of the filter screen of an overhead cleaner;

FIG. 3 is an end elevational view looking in the direction of the horizontal arrow on FIG. 2 showing the stationary suction head of the filter cleaning means; and FIG. 4 is a detail view looking down on the traveling cleaner showing the relationship between the suction orifice of the suction head and the filter screen of the cleaner.

Description of the preferred embodiment

Referring now more particularly to the drawings, like numerals in the various figures will be taken to designate like parts.

As illustratively shown in FIG. 1 the cleaning equipment 10 embodying the instant inventive concept is shown as employed on a spinning frame 11 provided with a guide rail 12 on which a traveling overhead cleaner 13 is mounted for traverse. The overhead cleaner 13 is shown schematically as provided with the conventional circular filter screen 14, arranged on the upper surface of the overhead cleaner housing as best seen in FIGS. 2 and 4.

At the head end of the spinning frame 11 (to the left as viewed in FIGS. 1 and 2) is a stationary suction system 15 comprising a collector unit 16 and suction duct 17 extending therefrom. Collector unit 16, as will be understood by those skilled in the art, may be of a variety of forms such as shown in Patent 3,086,458.

At the end of the suction duct 17 a cylindrical suction head 18 is arranged with its axis at right angles to the direction of traverse of the overhead cleaner 13. Suction head 18 is formed with an intake orifice 19, as best seen in FIG. 4. The suction duct 17 and suction head 18 are interconnected to provide a continuous air flow path. The dimensioning of the intake orifice 19 is such that it extends at least across the filter screen 14. As illustrated the orifice 19 is preferably of a rectangular configuration with a length at least as great as the transverse dimension of the filter screen across its direction of movement so that the entire screen 14 will be exposed to the orifice 19 as the cleaner 13 traverses beneath head 18.

A shutoff valve 20 is provided on suction head 18 to close intake orifice 19. The shutoff valve 20, as best seen in FIGS. 2 and 3 is a yoke shaped element having two upstanding arms 22 on each end of cross member 23. Cross member 23 is dimensioned to substantially cover intake orifice 19 having a width which is preferably slightly larger than the width of orifice 19, and a length such that upstanding arms 21 and 22 may be pivotally secured to the ends of cylindrical suction head 18, so that the valve 20 comprising the arms 21 and the associated cross-member 23 may be pivoted about the axis of the cylindrical suction head 18, as best seen in FIG. 2.

An actuating cam roll 32 is secured at the lower end of arm 22, as best seen in FIGS. 2 and 3 with cam roll 32 lying in the path of traversal of the traveling overhead cleaner 13. As seen in FIG. 2, cam roll 32 is of a diameter larger than the width of cross-member 23 or arm 21 or 22 so that during traversal of the overhead cleaner the roll 32 will be the only element contacted. This roll 32 is preferably of a relatively friction free resilient material such as Teflon or the like minimizing friction and jarring of the relatively moving components.

Operation

In use, the aforedescribed components are arranged so that the suction head 18 is positioned with its intake orifice 19 permitting free passage of the filter screen 14, but at a distance such that the airstream established in suction duct 17 will be effective in cleaning the filter screen 14. A distance of between .04 and 1.4 inches is found satisfactory with conventionally available overhead cleaners and collector units.

Thereafter as the overhead cleaner 13 reciprocates to and fro on rail 12, at one point, preferably adjacent an end of its path of travel, the overhead cleaner 13 will encounter the cam roll 32 to displace the yoke shaped valve comprising crossmember 23 to open intake orifice 19 at which time the airstream in suction duct 17 will entrain any foreign matter accumulated on filter screen 14.

As the overhead cleaner 13 moves to the right as viewed in the drawings, the yoke shaped valve member 20 moves downwardly under the action of gravity so that cross arm 23 closes off the intake orifice 19. It will be understood by those skilled in the art that there is sufficient clearance between cross-member 23 and intake orifice 19 so as to permit free movement of the yoke. This clearance also permits the continuous flow of air through the suction system 15, thereby insuring the passage of any material pulled into duct 17 to the collector unit 16.

As understood by those skilled in the art, the overhead cleaner continues in its normal operative to and forth traverse over the spinning frame until it is again returned to displace the yoke shaped valve for cleaning of the filter screen. Thus during each cycle of traverse of the overhead cleaner, its filter screen 14 is automatically cleaned.

What is claimed is:

1. Cleaning equipment for cleaning the filter screen of traveling overhead cleaners, said equipment comprising a stationary cylindrical suction head positioned with its axis perpendicular to the path of travel of the overhead cleaner, said suction head having an intake orifice which is in suction applying relationship with respect to the filter screen of the overhead cleaner during a portion of the movement of the overhead cleaner; said suction head having a valve member normally closing off the intake orifice of said suction head, said valve member movably mounted with respect to said suction head for displacement by the movement of the overhead cleaner; said valve member having a yoke shaped configuration having a cross-member dimensioned to lie over the intake orifice of said suction head, and arms supporting said cross-member pivoted to the ends of said suction head to permit pivoting of said cross-member about the axis of said cylindrical head whereby the weight of the said cross-member will normally bias the cross-member to an orifice closing position; a suction conduit coupled to said suction head; and a collector unit at the other end of said suction conduit to which the air and any entrained material is fed.

2. Suction cleaning equipment as in claim 1 in which a cam element is secured to said valve member which extends beyond the bounds of the yoke for contact by the cleaner.

3. Cleaning equipment for cleaning the filter screen of traveling overhead cleaners, said equipment comprising: a collector unit; a suction duct coupled to said unit; a cylindrical suction head connected to said duct and positioned with its cylindrical axis transverse to the path of movement of the cleaner, said head having an intake orifice positioned in suction applying relationship with respect to the filter screen of the overhead cleaner during a portion of its travel; a yoke shaped valve member having a cross-member closing off the intake orifice when the traveling cleaner is not in cleaning relationship to said head, and arms on said cross-member pivotally secured to the heads of said cylindrical head, whereby upon movement of the cleaner against said valve the valve will rotate about said cylindrical head to open the intake orifice.

References Cited

UNITED STATES PATENTS

| | | | |
|---|---|---|---|
| 2,585,186 | 2/1952 | Taylor ---------- | 15—419 XR |
| 3,011,205 | 12/1961 | Holtzclaw -------- | 15—312.1 |
| 3,299,463 | 1/1967 | McEachern --------- | 15—312 |

FOREIGN PATENTS

| | | |
|---|---|---|
| 207,005 | 2/1909 | Germany. |

ROBERT W. MICHELL, Primary Examiner

U.S. Cl. X.R.

15—352; 55—294